US009275624B2

(12) United States Patent
Kimura

(10) Patent No.: US 9,275,624 B2
(45) Date of Patent: Mar. 1, 2016

(54) AUDIO PROCESSING APPARATUS

(71) Applicant: CANON KABUSHIKI KAISHA, Tokyo (JP)

(72) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 13/779,605

(22) Filed: Feb. 27, 2013

(65) Prior Publication Data

US 2013/0230189 A1    Sep. 5, 2013

(30) Foreign Application Priority Data

Mar. 2, 2012   (JP) ................................. 2012-046791

(51) Int. Cl.
| G10K 11/16 | (2006.01) |
| G10L 21/0224 | (2013.01) |
| G10L 21/0356 | (2013.01) |
| G03B 31/00 | (2006.01) |

(52) U.S. Cl.
CPC ............... G10K 11/16 (2013.01); G03B 31/00 (2013.01); G10L 21/0224 (2013.01); G10L 21/0356 (2013.01)

(58) Field of Classification Search
CPC ..................... H04R 2227/001; H04R 2460/01; H04R 1/1083; G10K 11/175; G10K 11/178; G10K 2210/108; G10K 2210/1081; G10K 2210/11
USPC .................. 381/13, 317, 74, 71.1, 71.8, 71.9, 381/71.11–71.14, 73.1, 94.1–94.9
See application file for complete search history.

(56) References Cited

U.S. PATENT DOCUMENTS

| 7,596,231 | B2 * | 9/2009 | Samadani | ..................... 381/94.2 |
| 2006/0265218 | A1 | 11/2006 | Samadani | |
| 2011/0176032 | A1 * | 7/2011 | Kajimura | .................. 348/231.4 |
| 2011/0305351 | A1 * | 12/2011 | Kimura | ........................ 381/94.1 |

FOREIGN PATENT DOCUMENTS

| CN | 101969592 A | 2/2011 |
| CN | 102280108 A | 12/2011 |
| JP | 2006-203376 A | 8/2006 |
| JP | 2008-053802 A | 3/2008 |

OTHER PUBLICATIONS

Telecommunication Standardization Sector of ITU (ITU-T), "Series G: Transmission Systems and Media, Digital Systems and Network" G.711-Appendix I, 2000, Geneva/Switzerland.

* cited by examiner

Primary Examiner — Paul S Kim
Assistant Examiner — Sabrina Diaz
(74) Attorney, Agent, or Firm — Canon USA, INC. IP Division

(57) ABSTRACT

An audio processing apparatus includes an acquisition unit configured to acquire an audio signal, and an audio processing unit configured to reduce noise contained in the audio signal, wherein the audio processing unit complements an audio signal in a section containing noise of the audio signal with a signal generated based on an audio signal in a predetermined section before the section containing noise and an audio signal in a predetermined section after the section containing noise, and wherein, in a case where noise is contained in one of the audio signal in the predetermined section before the section containing noise and the audio signal in the predetermined section after the section containing noise, the audio processing unit complements the audio signal in the section containing noise with a signal generated based on the audio signal in a noise-free section.

13 Claims, 16 Drawing Sheets

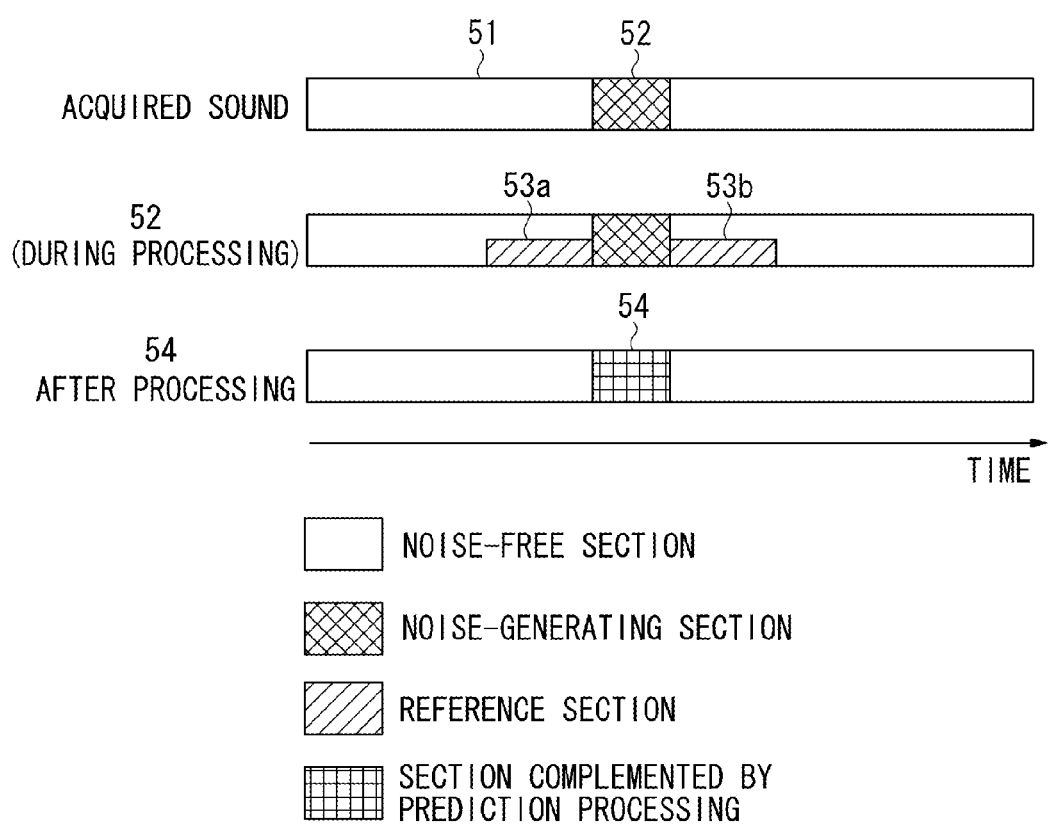

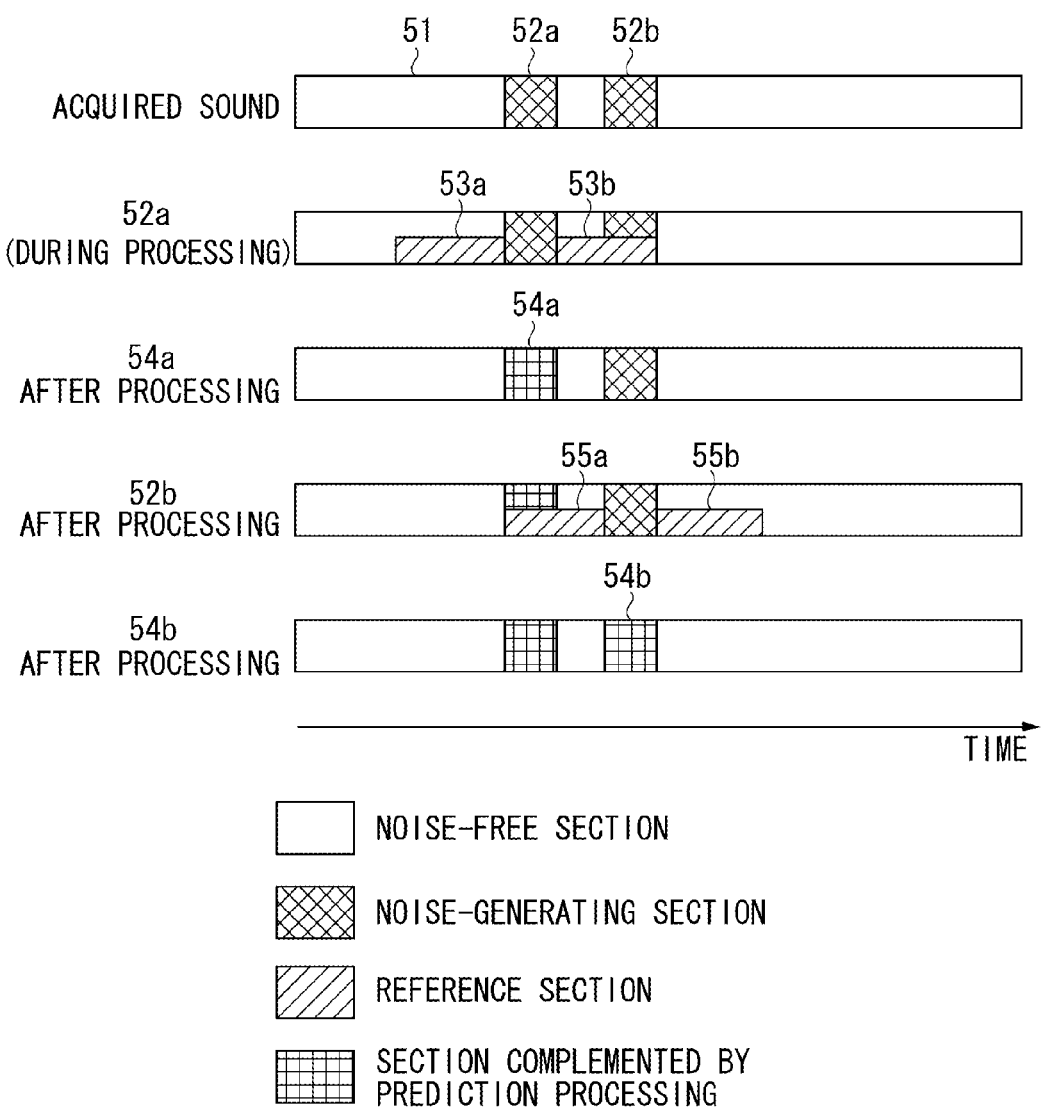

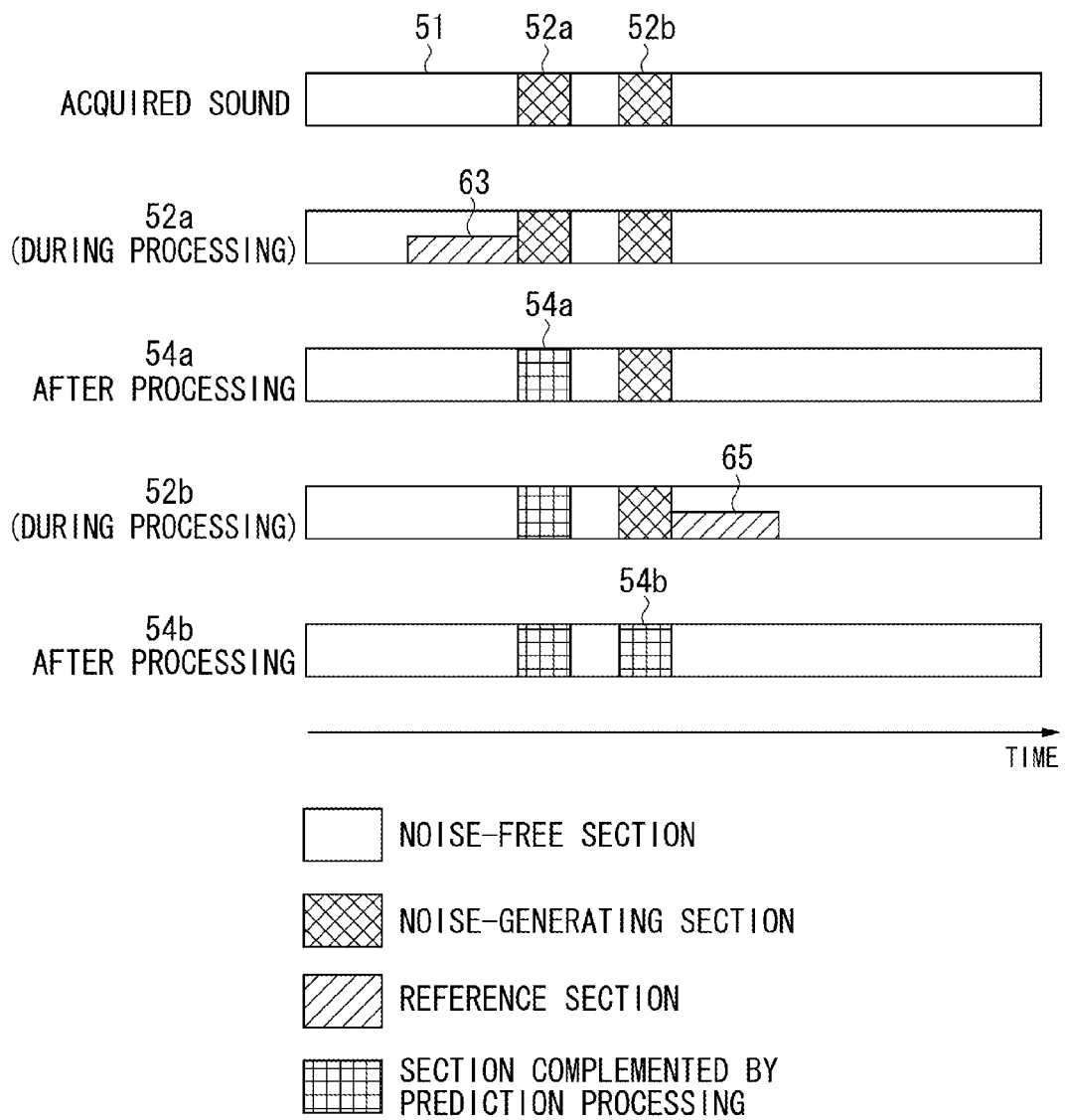

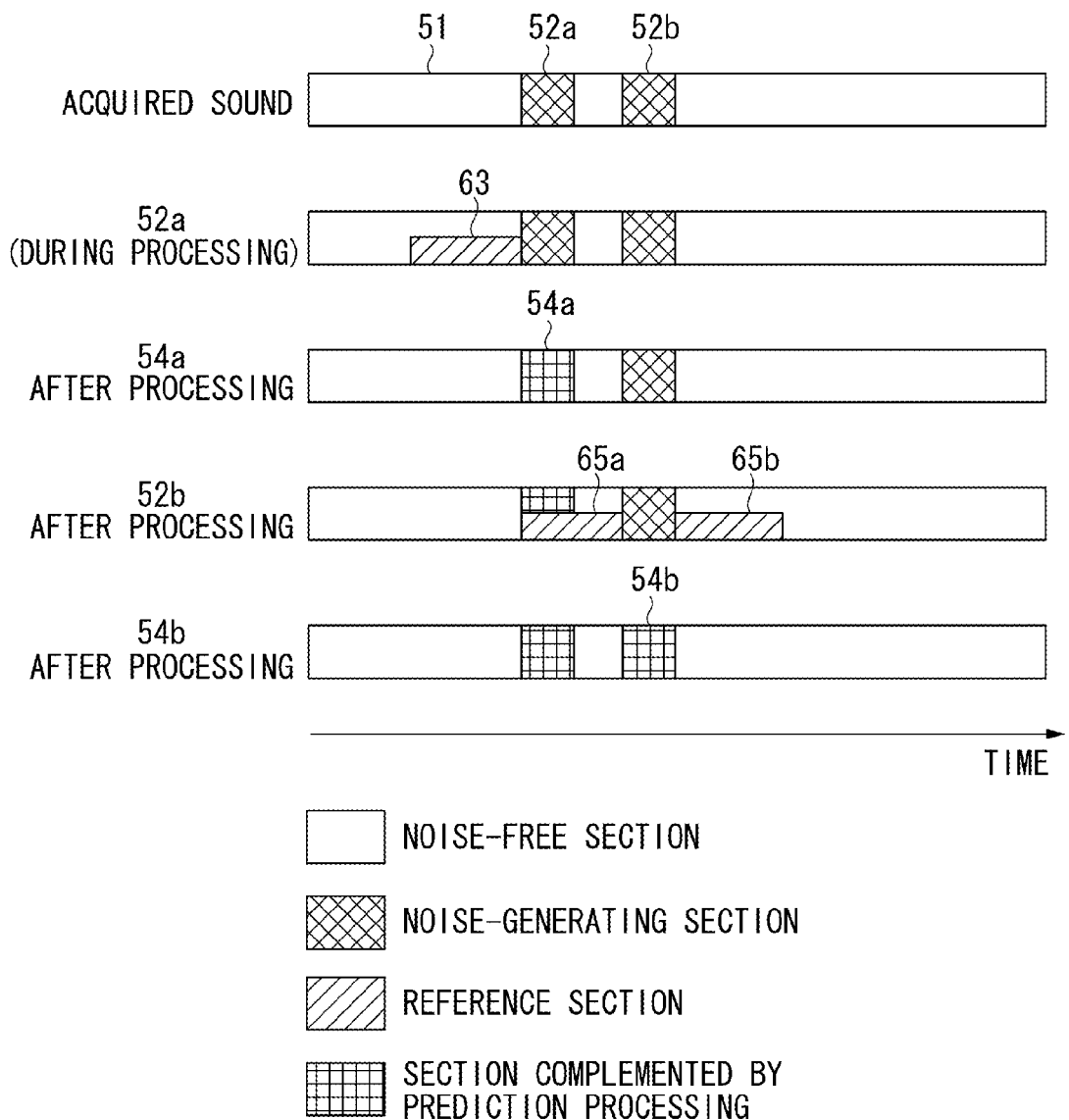

AUDIO PROCESSING APPARATUS

BACKGROUND OF THE INVENTION

1. Field of the Invention

The present invention relates to an audio processing apparatus.

2. Description of the Related Art

An imaging apparatus capable of recording sound with a captured moving image is known as the conventional audio processing apparatus.

In the imaging apparatus, a problem that noise generated according to driving of an optical system is recorded as sound is raised and, thus, various noise reduction techniques relating to the problem are developed as discussed in Japanese Patent Application Laid-Open No. 2006-203376. In Japanese Patent Application Laid-Open No. 2006-203376, a technique for complementing sound generated in a noise generating section by using sound in the section immediately before driving a motor, in a case where an iris motor or a shutter motor of the imaging apparatus is driven, is discussed.

Japanese Patent Application Laid-Open No. 2008-053802 discusses a concealing method for concealing a head retraction noise of a hard disk drive. More specifically, an audio signal of a portion where the head retraction noise of the hard disk drive has been generated is generated based on signals before and after the audio signal to conceal the head retraction noise.

In the "International Telecommunication Union-Telecommunication Standardization Sector (ITU-T) Recommendation G. 711-Appendix I", a packet loss concealing method is disclosed in an audio transmission relating to a transmission and demodulation of sound. More specifically, a signal of the portion where the packet has been lost is generated by predicting the signal of the portion based on the signal before the packet has been lost. Further, when a packet is normally acquired again, a correction is made with a prediction such that a signal in a packet before the normal packet can be smoothly continued to the normal packet.

However, in a case where a noise reduction is performed by using the technique discussed in Japanese Patent Application Laid-Open No. 2006-203376, for example, if the iris motor and the shutter motor are sequentially driven, a noise of the iris motor may be contained in, for example, the sound for complementing a sound of a section during which the shutter motor is driven. In the above case, another noise is contained in the noise section, resulting in degradation of a noise reduction effect.

SUMMARY OF THE INVENTION

The present invention is directed to an audio processing apparatus capable of effectively carrying out a noise reduction even in a case where a plurality of types of noise is generated sequentially.

According to an aspect of the present invention, an audio processing apparatus includes an acquisition unit configured to acquire an audio signal, and an audio processing unit configured to reduce noise contained in the audio signal, wherein the audio processing unit complements an audio signal in a section containing noise of the audio signal with a signal generated based on an audio signal in a predetermined section before the section containing noise and an audio signal in a predetermined section after the section containing noise, and wherein, in a case where noise is contained in one of the audio signal in the predetermined section before the section containing noise and the audio signal in the predetermined section after the section containing noise, the audio processing unit complements an audio signal in the section containing noise with a signal generated based on an audio signal in a noise-free section.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates prediction processing according to the present exemplary embodiment.

FIG. 8 illustrates prediction processing according to the present exemplary embodiment.

FIG. 9 illustrates the prediction processing according to the present exemplary embodiment.

FIG. 12 illustrates the prediction processing according to the present exemplary embodiment.

DESCRIPTION OF THE EMBODIMENTS

Various exemplary embodiments, features, and aspects of the invention will be described in detail below with reference to the drawings.

In the present exemplary embodiment, an imaging apparatus capable of subjecting an audio signal acquired by collecting an ambient sound to noise reduction processing.

Figure 1:
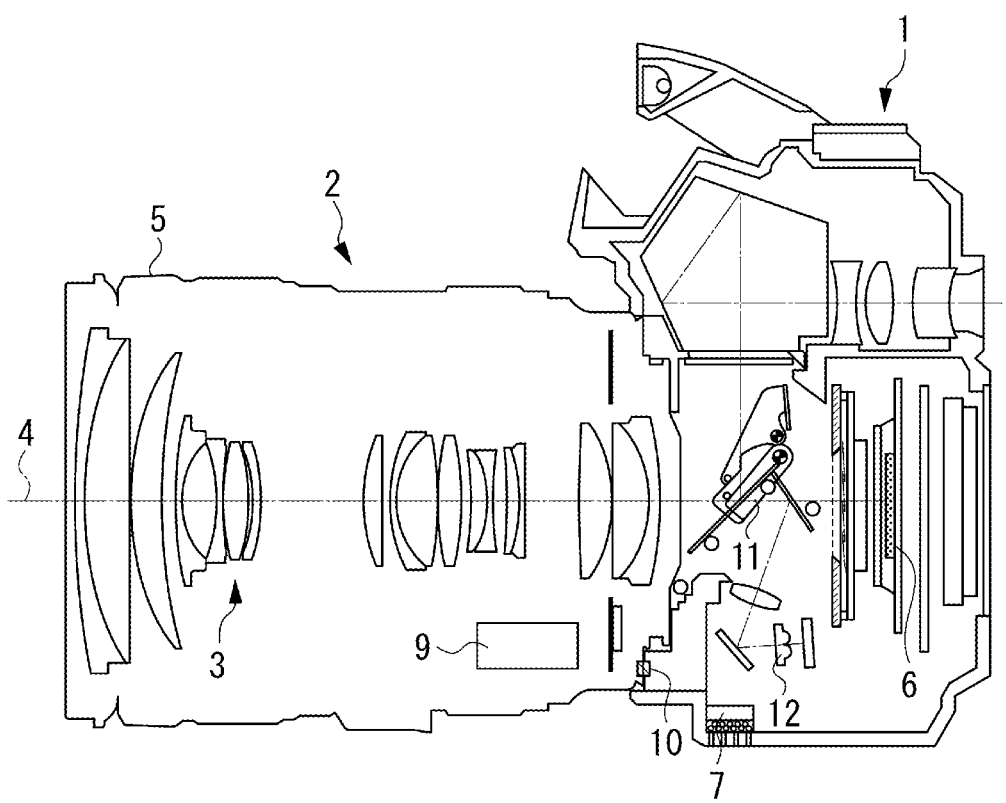
FIG. 1 is a schematic view illustrating an imaging apparatus according to an exemplary embodiment of the present invention.

FIG. 1 is a schematic diagram of an imaging apparatus according to the present exemplary embodiment. In FIG. 1, an imaging lens 2 is mounted on an imaging apparatus 1. The imaging apparatus 1 and the imaging lens 2 are electrically connectable with each other via an electric contact 10. While the imaging apparatus 1 and the imaging lens 2 are electrically contacted with each other, a control unit (not illustrated)

of the imaging apparatus 1 and a control unit (not illustrated) of the imaging lens 2 can be communicated with each other via the electric contact 10.

The imaging apparatus 1 converts an optical image of an object to an electric signal to acquire an image signal. For example, the imaging apparatus 1 includes an image sensor 6, such as a photoelectric conversion element, and a microphone 7 for converting a sound vibration of the ambient sound into an electrical signal to acquire an audio signal. The imaging apparatus 1 further includes a focus detection unit 12 including a quick-return mirror mechanism 11 and an autofocus (AF) sensor.

On the other hand, the imaging lens 2 includes a lens barrel 5 and an imaging optical system 3 including a plurality of lenses or a single lens aligned along an optical axis 4 of the imaging lens 2. The imaging lens 2 further includes an optical system driving unit 9 for driving the lens/lenses of the imaging optical system 3.

The control unit (not illustrated) of the imaging apparatus 1 controls the quick-return mirror mechanism 11 to guide a portion of an optical image of an object input from the imaging lens 2 to the focus detection unit 12 and controls the focus detection unit 12 to execute focus detection. The control unit of the imaging apparatus 1 may also cause the focus detection unit 12 to perform exposure detection. The control unit of the imaging apparatus 1 transmits a lens driving command to the control unit of the imaging lens 2 based on the detection result. The control unit of the imaging lens 2 controls the optical system driving unit 9 based on the lens driving command to drive lenses of the imaging optical system 3. The control unit of the imaging lens 2 may cause the optical system driving unit 9 to drive a diaphragm of the imaging optical system 3 according to a driving command based on the result of the exposure detection.

The control unit of the imaging apparatus 1 according to the present exemplary embodiment may control the quick-return mirror mechanism 11 with an optical image formed on the image sensor 6 At the time, the control unit of the imaging apparatus 1 may analyze a state of the image of an image signal obtained from the image sensor 6 as while controlling the imaging optical system 3 of the imaging lens 2. In other words, the control unit of the imaging apparatus 1 also can control the optical system driving unit 9 to gradually drive the imaging optical system 3 such that an edge portion of the image of the image signal obtained by the image sensor 6 becomes sharp.

With the imaging apparatus 1 according to the present exemplary embodiment, the user can acquire the image signal of the object from the image sensor 6 in synchronization with an operation of a release button (not illustrated) to record, after subjecting the image signal to predetermined image processing, the image signal of the object in a storage medium (not illustrated).

A function of the imaging apparatus 1 according to the present exemplary embodiment is described below.

Figure 2:
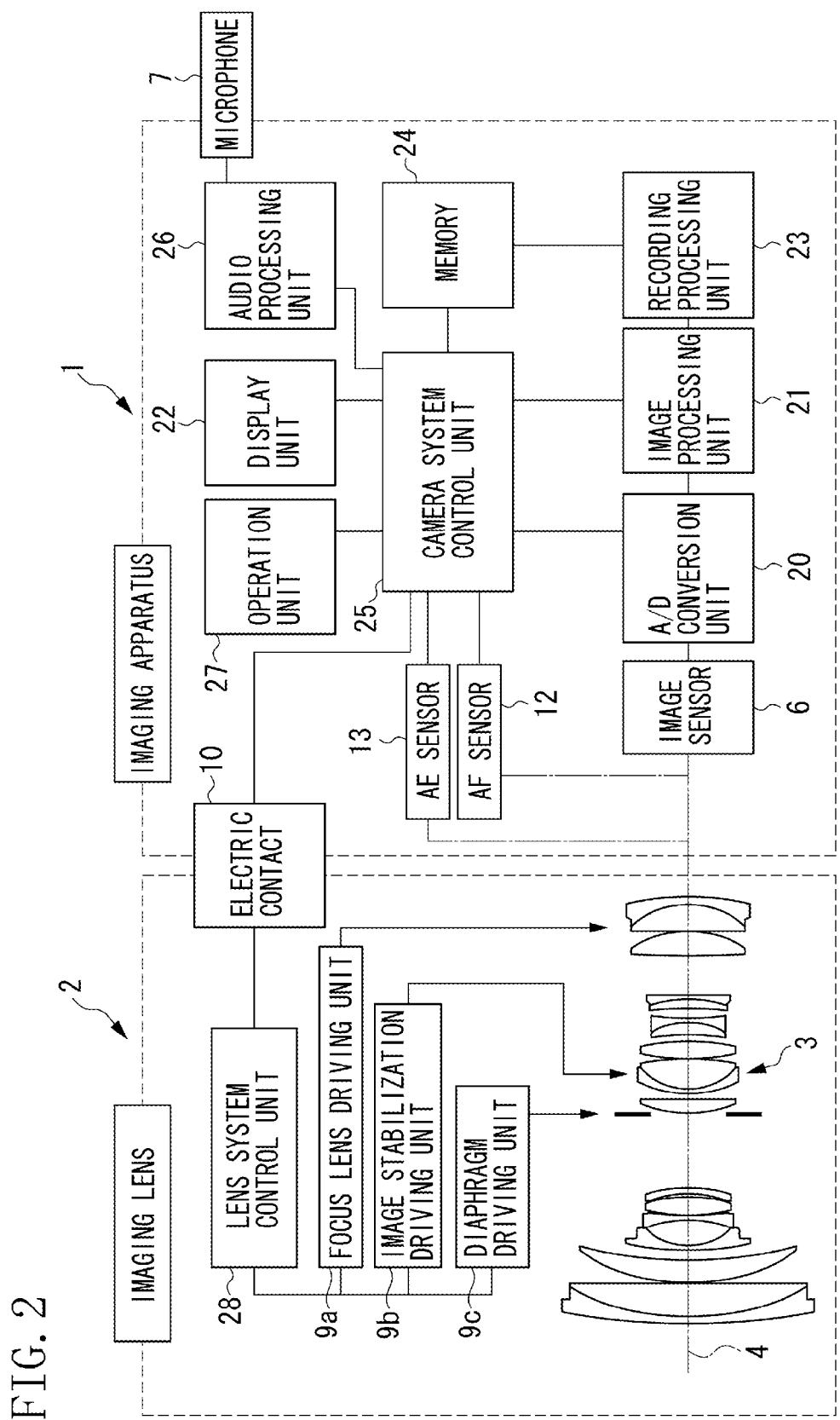
FIG. 2 is a block diagram illustrating functions of the imaging apparatus and an imaging lens according to the present exemplary embodiment.

FIG. 2 is a block diagram illustrating functions of the imaging apparatus 1 and the imaging lens 2 according to the present exemplary embodiment.

In FIG. 2, the imaging apparatus 1 includes the focus detection unit 12, an exposure detection unit 13, the image sensor 6, an analog-to-digital (A/D) conversion unit 20, an image processing unit 21, a recording processing unit 23, a memory 24, a camera system control unit 25, a microphone 7, an audio processing unit 26, an operation unit 27, and a display unit 22. On the other hand, the imaging lens 2 includes the imaging optical system 3, a lens system control unit 28, a focus lens driving unit 9a, an image stabilization driving unit 9b, and a diaphragm driving unit 9c.

Each functional block may be actually configured to be in the form of each independent hardware or a plurality of functional blocks may be configured to be single hardware. For example, the camera system control unit 25 includes a microcomputer including a central processing unit (CPU) and a memory. The microcomputer may execute the functions of other functional blocks.

In an imaging system, an optical image of an object is formed on an imaging plane of the image sensor 6 via the imaging optical system 3. During a preliminary action for image capturing, such as aiming, a mirror provided in the quick-return mirror mechanism 11 guides, instead of guiding an optical image to the image sensor 6, the optical image to a side of a finder as well as a portion of light flux to the focus detection unit 12. Based on a detection result of the focus detection unit 12, the below-described control system appropriately adjusts the imaging optical system 3. Accordingly, the image sensor 6 is exposed to object light with an adequate light amount, so that an object image is formed adjacent to the image sensor 6.

The image processing unit 21 processes an image signal received from the image sensor 6 via the A/D conversion unit 20. For example, the image processing unit 21 includes a white balance circuit, a gamma correction circuit, and a complementary arithmetic circuit for improving resolution by complementary calculation.

In the sound processing system, the audio processing unit 26 subjects an audio signal acquired by the microphone 7 to an adequate processing, thereby generating an audio signal for recording. The generated signal for recording is linked with an image by a below-described recording processing unit, thereby being transmitted to the recording processing unit 23.

The recording processing unit 23 records stream data including an image signal and an audio signal in a storage medium (not illustrated) and further generates an image to be output to the display unit 22. The recording processing unit 23 performs compressing and encoding processing of an image, a moving image, and sound by using a predetermined method. In the present exemplary embodiment, any kind of compressing and encoding processing may be employed.

The camera system control unit 25 controls each block of the imaging apparatus 1. For example, based on an input from the operation unit 27, the camera system control unit 25 generates and outputs a timing signal upon capturing an image and outputs a command signal for driving lenses to the control unit of the imaging lens 2. The camera system control unit 25 also functions as a determination unit to be described for determining an ambient sound level and a comparison unit for comparing the ambient sound with a driving sound. The focus detection unit 12 detects an in-focus state of an optical image of an object. The exposure detection unit 13 detects luminance of an object. The lens system control unit 28 causes the optical system driving unit 9 to drive the lenses adequately according to a signal of the camera system control unit 25 to adjust the optical system.

The camera system control unit 25 detects, for example, an operation signal corresponding to a shutter release button of the operation unit 27 to control driving of the image sensor 6, an operation of the image processing unit 21, and the compressing processing of the recording processing unit 23. The camera system control unit 25 controls the state of each segment of the information display apparatus for displaying information on the display unit 22, such as an optical finder and a liquid crystal monitor.

An adjustment operation of the optical system by the control system is described below. The camera system control unit 25 connects with the focus detection unit 12 and the exposure detection unit 13 to obtain, based on signals therefrom, a suitable focal position and diaphragm position. The camera system control unit 25 issues a command to the lens system control unit 28 via the electric contact 10. The lens system control unit 28 appropriately controls the focus lens driving unit 9a and the diaphragm driving unit 9c. The lens system control unit 28 further connects with a camera-shake detection sensor (not illustrated). Therefore, the lens system control unit 28 controls, in a camera-shake correction mode, the image stabilization driving unit 9b in a proper manner based on a signal from the camera-shake detection sensor.

An image capturing involving sound recording, such as moving image capturing, is described below. In the image capturing involving the sound recording, sound generated in driving actuators of lenses and a camera body (hereinafter, referred to as "sound in driving mechanism") is unnecessary sound, i.e., noise. Sound involved in an operation of a button/dial and friction with an outer surface member by a user (hereinafter, referred to as "sound in user's operation") is also unnecessary sound, i.e., noise. In the present exemplary embodiment, the noise does not mean a background noise, such as a white noise, but means the above-described sound in driving mechanism and sound in user's operation.

Figure 3:
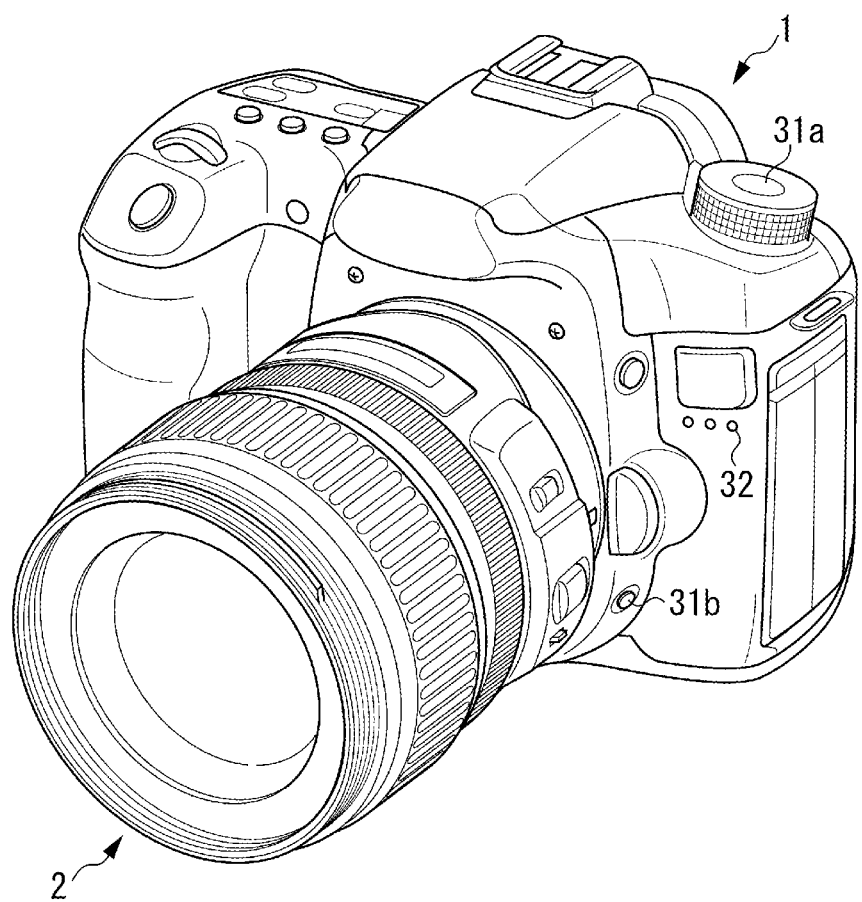
FIG. 3 is a perspective view illustrating the imaging apparatus and the imaging lens according to the present exemplary embodiment.

An effect of noise in image capturing involving sound recording is described below with reference to FIG. 3. FIG. 3 is a perspective view of a camera. FIG. 3 illustrates operation buttons 31a and 31b and microphone openings 32 for catching an external sound to guide the external sound to the microphone 7.

As clearly seen from FIG. 3, the operation buttons 31a and 31b of the camera and a driving unit (i.e., a motor or an actuator) within the imaging apparatus 1 and the imaging lens 2, i.e., noise sources with respect to the microphone openings 32, are disposed adjacent to each other.

In a case where the object is a person, the person is generally considered to be at a position away from the imaging apparatus by, generally, several meters to several tens of meters. Under the circumstances, even if the level of noise generated from the noise source is low, the effect of the noise with respect to the audio signal corresponding to the person and acquired by the microphone 7 cannot be ignored.

Therefore, to reduce the effect of the noise, the imaging apparatus 1 according to the present exemplary embodiment causes the audio processing unit 26 to execute noise reduction processing.

Figure 4:
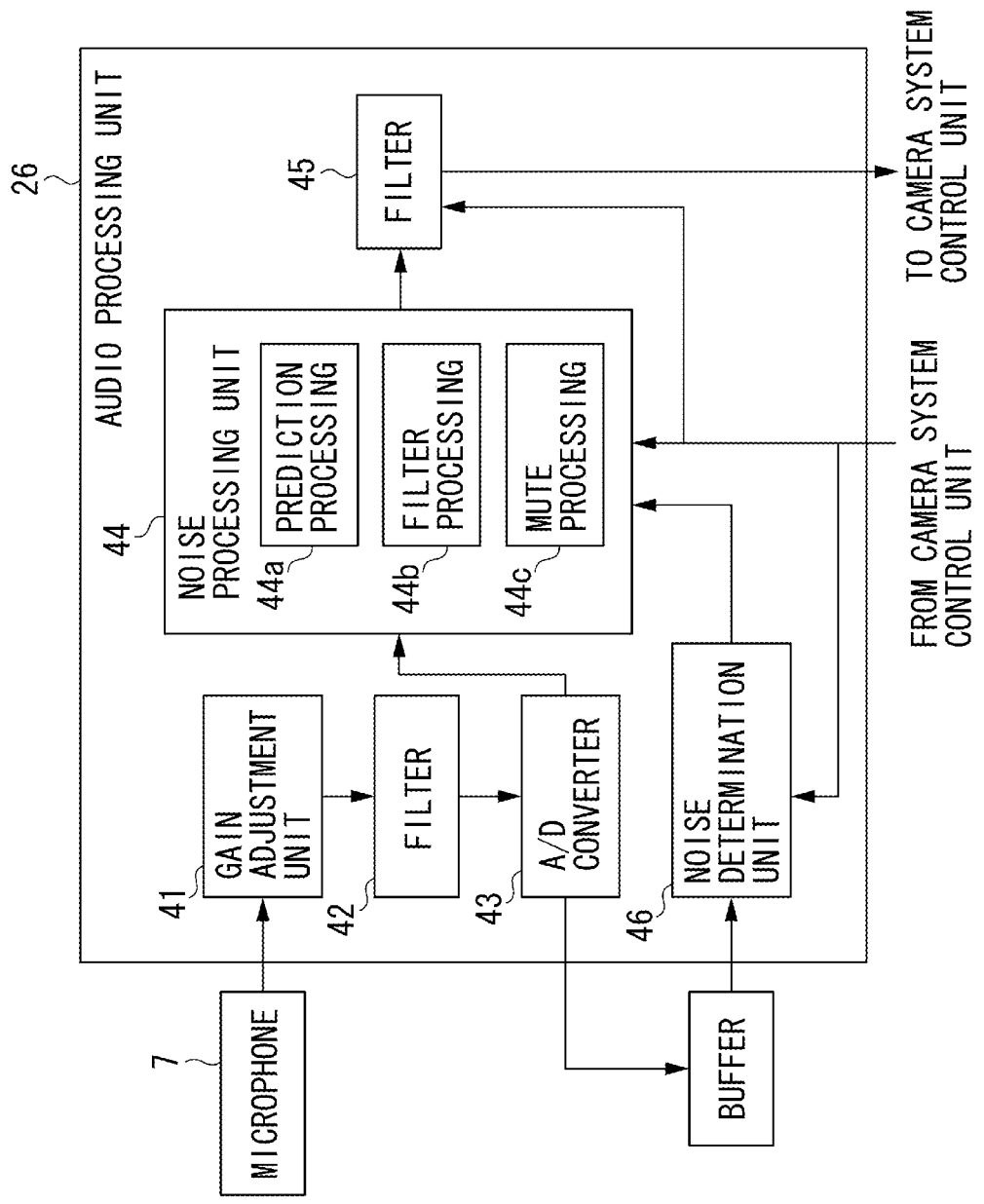
FIG. 4 is a block diagram illustrating functions of an audio processing unit.

An operation of the audio processing unit 26 is described below with reference to FIG. 4. FIG. 4 illustrates functions of the audio processing unit 26. The audio processing unit 26 includes a gain adjustment unit 41, a filter 42, an A/D converter 43, a noise processing unit 44, a filter 45, and a noise determination unit 46. The noise processing unit 44 can execute prediction processing, filter processing, and mute processing.

In FIG. 4, the audio signal acquired by the microphone 7 is supplied to the gain adjustment unit 41. The gain adjustment unit 41 adjusts a signal level of the microphone 7 such that a dynamic range of the A/D converter 43 can be utilized sufficiently. In other words, the gain adjustment unit 41 increases gain to amplify the signal when the signal level of the microphone 7 is low, whereas the gain adjustment unit 41 decreases gain to control saturation when the signal level of the microphone 7 is high.

The filter 42 includes a low-pass filter having a proper cutoff frequency in consideration of a sampling frequency of the A/D converter 43. In a case where the microphone 7 is positioned adjacent to an element, which generates a specific frequency, the filter 42 may include a suitable notch filter in addition to the above-described low-pass filter. The A/D converter 43 converts the audio signal processed by the gain adjustment unit 41 and the filter 42 into a digital signal.

The noise processing unit 44 can execute a plurality of types of noise processing. FIG. 4 exemplifies prediction processing 44a, filter processing 44b, and mute processing 44c. In addition thereto, however, the noise processing unit 44 may execute another processing. The audio processing unit 26 is controlled by the camera system control unit 25. Also, which noise processing is to be executed by the noise processing unit 44 is controlled by the camera system control unit 25. The plurality of types of noise processing can be operated selectively or in combination.

The filter processing 44b according to the present exemplary embodiment eliminates noise by executing processing, such as a low-pass and a band pass, for passing the audio signal through sound having an appropriate frequency.

The mute processing 44c according to the present exemplary embodiment eliminates noise by replacing the audio signal of a section containing noise with a silent audio signal or a predetermined audio signal.

The prediction processing 44a according to the present exemplary embodiment is described below.

The filter 45 provides appropriate filter processing after the noise processing, if necessary. In a case where no filter processing is necessary, the filter processing may be omitted here.

Figure 5:
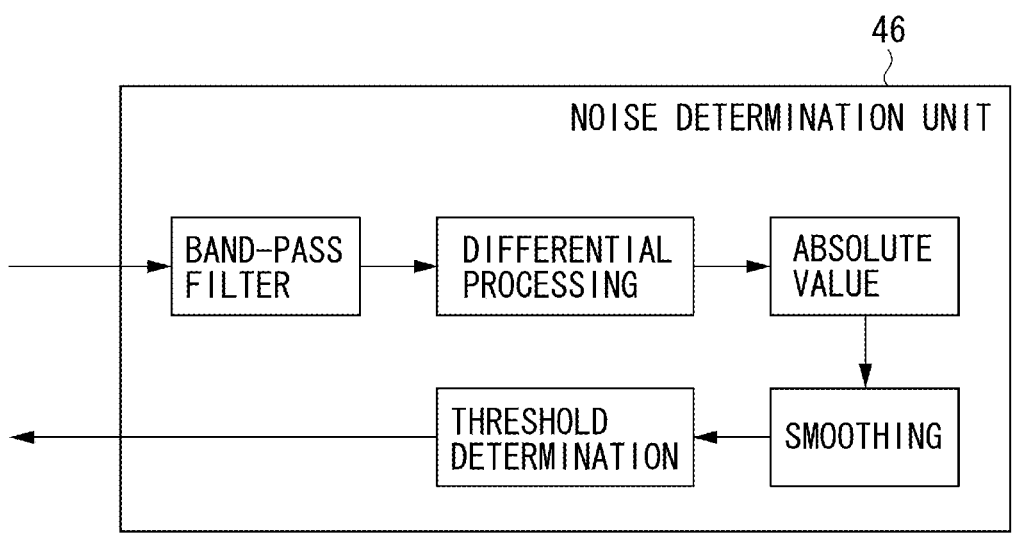
FIG. 5 illustrates an operation of a noise determination unit.

A noise determination unit 46 determines whether there is noise other than the sound generated by the object. A configuration example of the noise determination unit 46 is illustrated in FIG. 5.

More specifically, the noise determination unit 46 reads an audio signal of a section to be determined whether noise is contained therein from a buffer and provides an appropriate band-pass filtering. In the band-pass filtering, a band-pass filter passes the audio signal through an area containing less sound signal and having a remarkable level of the noise in driving mechanism and the noise in user's operation. For example, generally, the band-pass filter which passes the audio signal through a frequency band (e.g., about 5 kHz to 10 kHz) higher than that of the audio signal is used.

With respect to the signal after passing through the band-pass filter, a direct-current (DC) component generated due to the background noise is eliminated by differential processing. Depending on the characteristics of the band-pass filter, the differential processing may be omitted. Acquisition of an absolute value of the audio signal having been subjected to the differential processing and the subsequent smoothing processing thereof enables detection of the envelope of the signal. The noise determination unit 46 determines whether the acquired envelope of the signal excesses a threshold, thereby determining presence or absence of noise. The threshold is preliminary set based on a value obtained as a result of experimental calculation.

Figure 6A:
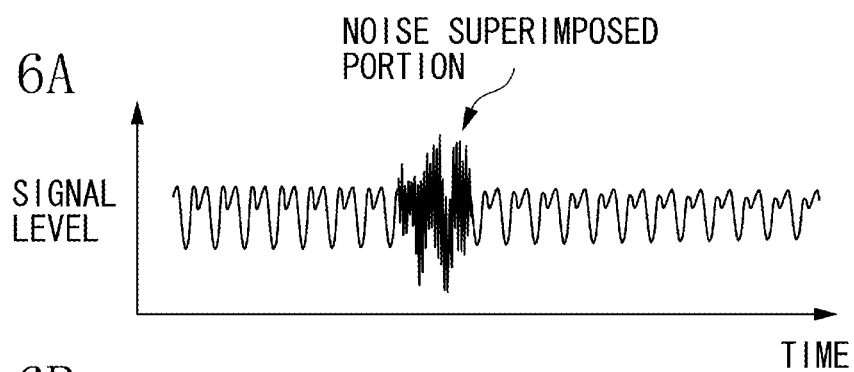
FIGS. 6A, 6B, 6C, 6D, and 6E each illustrate a state of a signal of a noise determination unit.
Figure 6B:
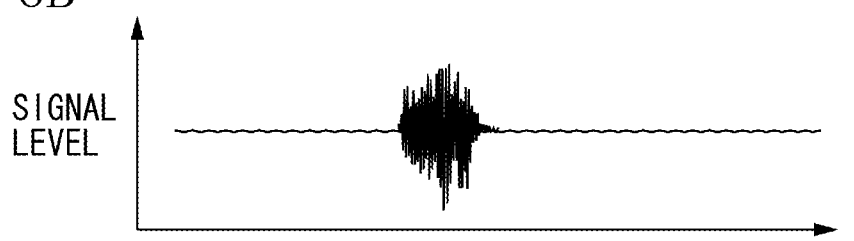
Figure 6C:
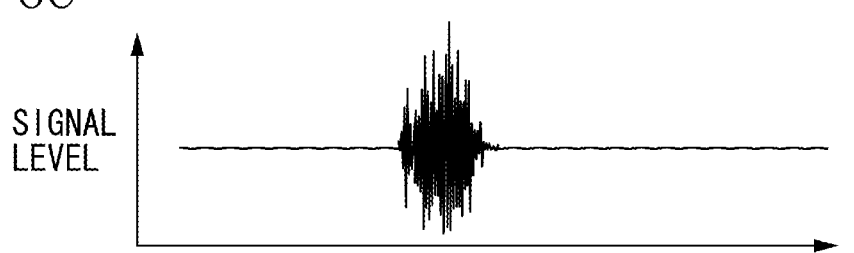
Figure 6D:
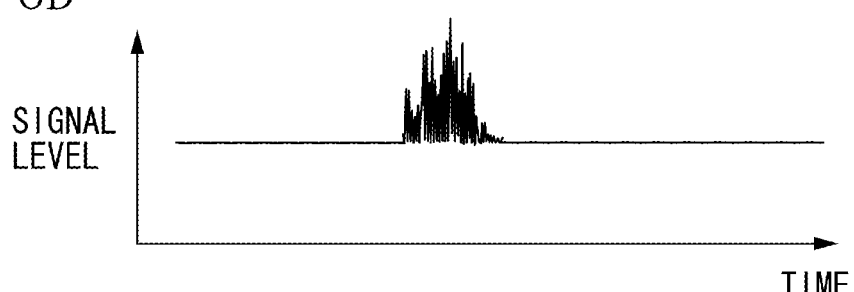
Figure 6E:
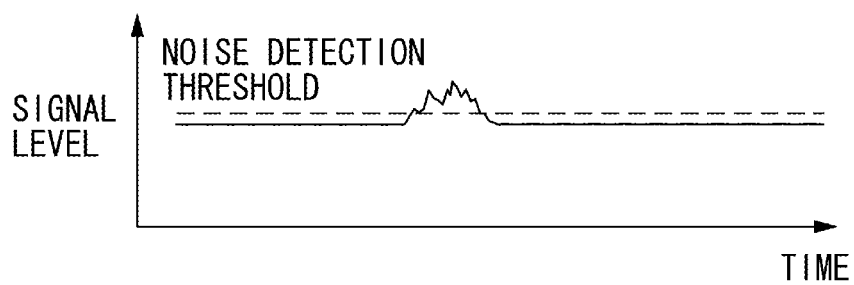

FIGS. 6A, 6B, 6C, 6D, and 6E each illustrate a specific example of a wave form in each processing of the noise determination processing performed by the noise determination unit 46. FIG. 6A illustrates the waveform of acquired sound. FIG. 6B illustrates a waveform after passing through the band-pass filter. FIG. 6C illustrates a waveform after the differential processing. FIG. 6D illustrates a waveform after the absolute value processing. FIG. 6E illustrates a waveform after the smoothing processing. FIG. 6A illustrates the waveform in a case where noise is superimposed on a human voice.

The noise contains a higher frequency component than the human voice. As it is clearly seen from FIG. 6B, an appropriate band-pass filtering enables effective acquisition elimination of a noise portion. In the examples of FIG. 6, as illustrated in FIG. 6C, the differential processing highlights a portion in which the waveform varies largely. As illustrated in FIGS. 6D and 6E, the absolute value processing and the smoothing processing generate waveforms having a power at the noise portion. In a case where the envelope exceeds the noise detection threshold of FIG. 6E, a determination can be made that the noise is generated.

In the present exemplary embodiment, in a case where the camera system control unit 25 of the imaging apparatus 1 transmits a lens driving signal to the lens system control unit 28 of the imaging lens 2, the camera system control unit 25 can recognize a section at which noise is generated by the driving of the lenses. Therefore, in a case where the lens driving signal is transmitted by the camera system control unit 25, the section at which noise is generated can be specified by a transmission time of the signal or the lens driving time indicated by the lens driving signal. Therefore, the camera system control unit 25 can control, based on the lens driving signal, a section at which noise reduction is to be performed by the noise processing unit 44 of the audio processing unit 26.

A relationship between the determination result of presence or absence of noise determined by the noise determination unit 46 and an operation of the above-described audio processing unit 26 is described below.

In the imaging apparatus 1 according to the present exemplary embodiment, the camera system control unit 25 changes operations of the noise processing unit 44 according to the determination result of the noise determination unit 46.

As a result of the determination by the noise determination unit 46, the noise processing unit 44 is set not to execute any noise processing with respect to the audio signal of a section at which no noise has been determined to be generated. Similarly, the camera system control unit 25 controls the filter 45 not to operate. At the time, the signal itself, which is converted by the A/D converter 43, is transmitted to the camera system control unit 25 as the audio signal for recording.

In a case where the noise is present partially, the noise processing unit 44 provides the noise processing on the sound based on a command from the camera system control unit 25.

Signal processing according to the present exemplary embodiment is described below with reference to FIGS. 7 to 14.

Prediction processing executed by the audio processing unit 26 is described below.

The prediction processing is performed by using a signal processing technique disclosed in, for example, "ITU-T Recommendation G. 711-Appendix I". In the technique, a signal to be replaced with the noise-generating section is generated by an arithmetic processing based on a signal of a predetermined section (i.e., a reference section) adjacent to a section containing noise (i.e., the noise-generating section). Accordingly, a signal of the section at which noise is generated or packet loss occurs can be complemented. In the arithmetic processing, for example, a pitch of the signals of the reference section may be detected to generate signals which repeat the signals of the reference section at the detected pitch. In other words, in the prediction processing, the signal of the noise-generating section is replaced with a signal generated based on the predetermined section adjacent to the noise-generating section, thereby acquiring a signal resulting in that noise of the noise-generating section is reduced.

FIG. 7 schematically illustrates the prediction processing. FIG. 7 illustrates a section 51 at which no noise is contaminated (i.e., a noise-free section), a section 52 at which noise is contaminated (i.e., a noise-generating section), reference sections 53a and 53b to be used in the prediction processing, and a section 54 after the prediction processing.

A method for generating a signal by the prediction processing discussed in, for example, Japanese Patent Laid-Open No. 2006-203376, Japanese Patent Laid-Open No. 2008-053802, and "ITU-T Recommendation G. 711-Appendix I" may be used. In other words, any publicly known method may be used as far as the method includes generating a signal of the noise-generating section based on a signal of the predetermined section (i.e., the reference section) adjacent to the noise-generating section.

As illustrated in FIG. 7, in the prediction processing, when the noise-generating section 52 is determined, the signal of the noise-generating section 52 is replaced with a signal generated based on the signals of the reference sections 53a and 53b adjacent to the noise-generating section 52 (i.e., the section 54 is generated according to the prediction processing).

In the present exemplary embodiment, as illustrated in FIG. 7, the signal of the noise-generating section is to be generated, in a normal operation, based on the signals of the reference sections 53a and 53b before and after the noise-generating section 52.

FIG. 8 illustrates processing according to the present exemplary embodiment. FIG. 8 illustrates, different from FIG. 7, signal processing in a case where noise is sequentially generated to be superimposed also on the signals of the reference sections.

FIG. 8 illustrates the noise-free section 51 and the noise-generating sections 52a and 52b. FIG. 8 also illustrates the reference sections 53a and 53b to be used in generating the signal corresponding to the noise-generating section 52a. FIG. 8 further illustrates a section 54a equivalent to the section 52a after the prediction processing, reference sections 55a and 55b to be used in subjecting the noise-generating section 52b to the prediction processing, and a section 54b equivalent to the section 52b after the prediction processing. FIG. 8 exemplifies a case where reference the section 53b is contaminated with noise because the noise-generating sections 52a and 52b are generated temporally closely. Therefore, the predictably generated section 54a may have an inadequate signal due to an effect of the noise in the noise-generating section 52b. Similarly, as a result of using the section 54a affected by the noise as the reference section 55a, the predictably generated section 54b also may have an inadequate signal.

The above occasion occurs, for example, in a case where the focus lens driving unit 9a is operated intermittently at narrow time intervals to make a focus adjustment according to an instruction of the camera system control unit 25 of the imaging apparatus 1. The above occasion also occurs in a case where sound is generated due to the user's operation to shift his imaging apparatus in the timing close to the occurrence of the sound generated by the driving mechanism.

FIG. 9 schematically illustrates signal processing in a case where the present invention is applied.

FIG. 9 illustrates the noise-free section 51 and the noise-generating sections 52a and 52b. FIG. 9 further illustrates a reference section 63 for subjecting the noise-generating section 52a to the prediction processing, and the section 54a equivalent to the section 52a after the prediction processing. FIG. 9 still further illustrates a reference section 65 for subjecting the noise-generating section 52b to the prediction processing and the section 54b equivalent to the noise-generating section 52b after the prediction processing.

FIG. 9 exemplifies a case that, similar to FIG. 8, the noise-generating sections 52a and 52b are generated in the timing close to each other.

In FIG. 9, when the noise-generating section 52a is processed, normally, the sections before and after the noise-generating section 52a are used as reference sections. However, in an example of FIG. 9, as a result of the processing of the noise determination unit 46, noise contamination to the reference section temporally after the noise-generating section 52a is detected. As a result, when the noise-generating section 52a is processed, the reference section temporally after the noise-generating section 52a is not used as the reference section but the section 54a is generated based on the reference section 63 temporally before the noise-generating section 52a.

Similarly, when the noise-generating section 52b is processed, the section 54b is generated based on the reference section 65.

As described above, when the prediction processing is executed, sections before and after the noise-generating section are used as the reference sections. However, in a case where another noise is generated in one of the reference sections, a prediction audio signal is generated based on the audio signal of the other reference section free from noise.

Accordingly, since the noise-free section is referred to, thus generated sections 54a and 54b is not affected by the noise-generating sections 52a and 52b. Therefore, a high quality sound is obtainable.

Figure 10A:
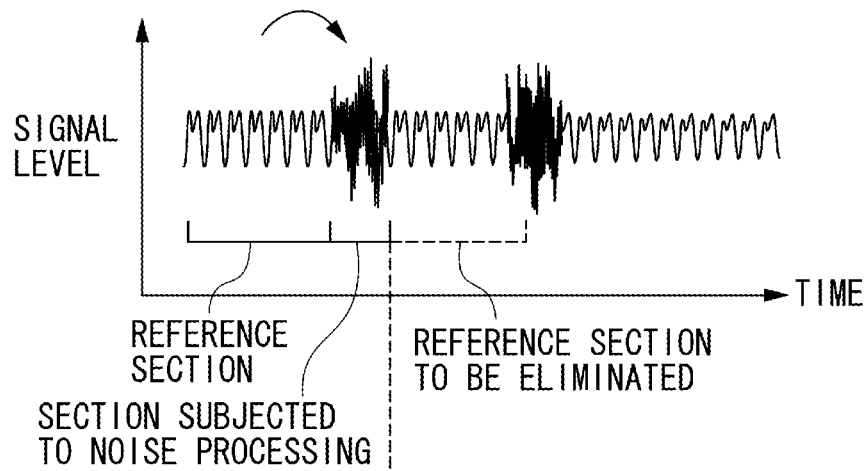
FIGS. 10A, 10B, and 10C each illustrate the prediction processing according to the present exemplary embodiment.
Figure 10B:
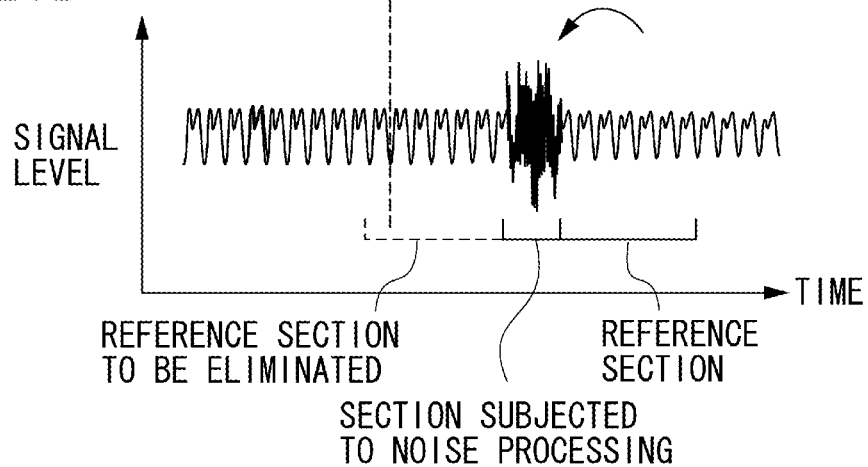
Figure 10C:
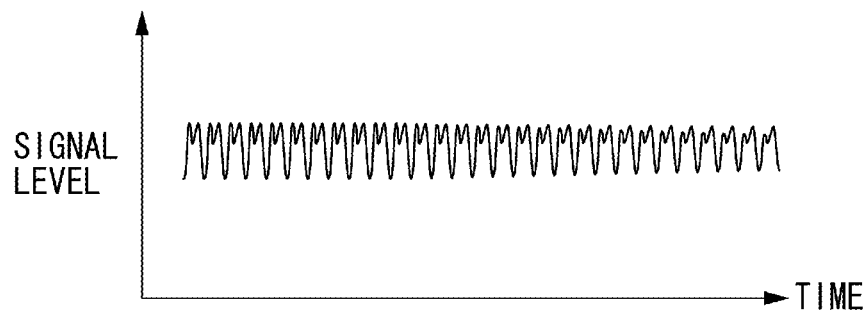

FIGS. 10A, 10B and 10C each illustrate a waveform of the audio signal generated according to the prediction processing described above with reference to FIG. 9. FIG. 10A illustrates a waveform before the prediction processing. FIG. 10B illustrates a waveform after the noise-generating section temporally before the other noise-generating section is subjected to the prediction processing. FIG. 10C illustrates a waveform after the noise-generating section temporally after the other noise-generating section is subjected to the prediction processing.

FIG. 10A illustrates a state that a first noise is reduced according to the audio signal generated based on the audio signal of the reference section. In FIG. 10A, as illustrated in FIG. 9, a second noise is contained in the reference section for reducing the first noise, so that the section containing the second noise is not used as the reference section.

FIG. 10B illustrates a state that the second noise is reduced. In FIG. 10B, as illustrated in FIG. 9, the second noise is reduced based on the audio signal of the noise-free reference section between the reference sections for the second noise.

Figure 11:
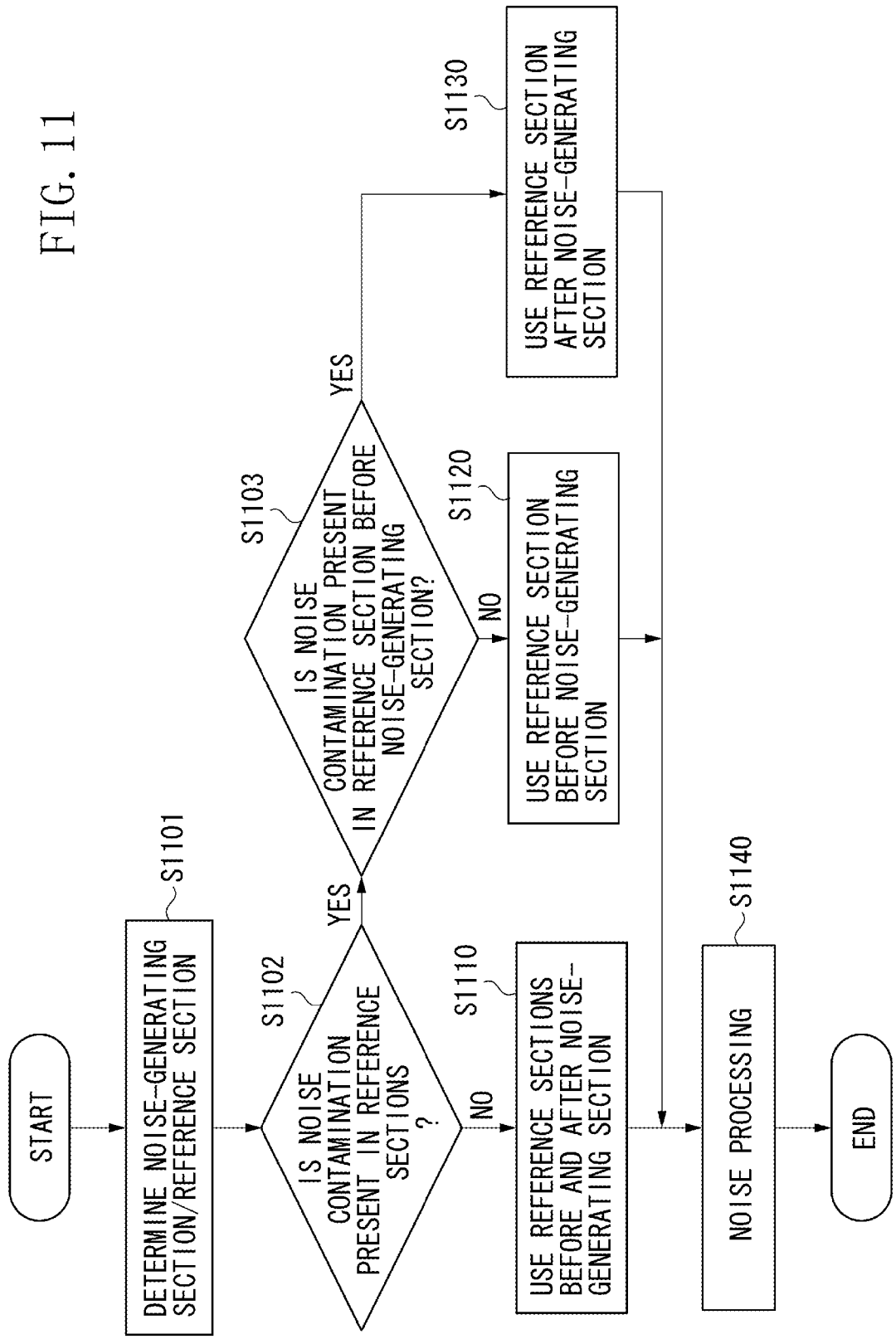
FIG. 11 is a flow chart illustrating an operation of the prediction processing according to the present exemplary embodiment.

Processing performed by the audio processing unit 26 of the imaging apparatus 1 according to the present exemplary embodiment is described below with reference to FIG. 11. The reference section for generating a signal to replace the signal of the noise-generating section is changed among sections before and after the noise-generating section, a section only before the noise-generating section, or a section only after the noise-generating section according to whether noise is contained in the reference section.

The camera system control unit 25 of the imaging apparatus 1 according to the present exemplary embodiment causes the noise determination unit 46 to analyze the audio signal acquired by the microphone 7 and detect presence or absence of noise to determine the noise-generating section in the audio signal processing unit 26.

In step S1101, the camera system control unit 25 determines sections before and after the noise-generating section to be reference sections.

In step S1102, the camera system control unit 25 determines whether another noise is contained in the sections determined to be the reference sections in step S1101.

In a case where another noise is not contained in the reference sections (NO in step S1102), in step S1110, the camera system control unit 25 controls the audio processing unit 26 to generate an audio signal to be used in noise reduction processing by using the audio signals of the reference sections both before and after the noise-generating section as the normal processing.

In a case where another noise is contained in the reference section (YES in step S1102), in step S1103, the camera system control unit 25 specifies the reference section which contains another noise between the reference sections.

In a case where another noise is contained in the reference section after the noise-generating section (NO in step S1103), in step S1120, the camera system control unit 25 controls the audio processing unit 26 to generate a signal for complementing the audio signal of the noise-generating section based on the reference section before the noise-generating section. On the other hand, in a case where another noise is contained in the reference section before the noise-generating section (YES in step S1103), in step S1130, the camera system control unit 25 controls the audio processing unit 26 to generate a signal for complementing the audio signal of the noise-generating section based on the reference section after the noise-generating section.

In step S1140, the camera system control unit 25 controls the audio signal processing unit 26 to replace the audio signal of the noise-generating section by using the complementary audio signal generated in steps S1110, S1120, and S1130.

A repetitive execution of the above processing allows the imaging apparatus 1 according to the present exemplary embodiment to reduce noise.

In the manner as described above, the imaging apparatus 1 according to the present exemplary embodiment can reduce the noise contained in the audio signal. In the processing for reducing noise, a signal for complementing the audio signal of the noise-generating section is generated based on the audio signal of the predetermined section (i.e., the reference section) adjacent to the section containing the noise (i.e., the noise-generating section). Then, the audio signal of the noise-generating section is complemented by using thus generated signal, resulting in reducing the noise.

Ina case where another noise is contained in the audio signal of the reference section, the camera system control unit 25 controls the audio signal processing unit 26 to generate a signal for complementing the audio signal of the noise-generating section based on the audio signal of the noise-free reference section.

Accordingly, the imaging apparatus 1 according to the present exemplary embodiment can minimize an effect of another noise when generating a signal for complementing the audio signal of the noise-generating section.

The imaging apparatus 1 according to the present exemplary embodiment also can execute another noise reduction processing as illustrated in FIGS. 12 to 16 in addition to the noise reduction processing as illustrated in FIGS. 9 and 10A to 10C.

FIGS. 12 and 13A to 13C illustrate another noise reduction processing. FIG. 12 illustrates the noise-free section 51 and the noise-generating sections 52a and 52b. FIG. 12 further illustrates the reference section 63 to be used in subjecting the noise-generating section 52a to the prediction processing and the signal 54a equivalent to the noise-generating section 52a after the prediction processing. FIG. 12 still further illustrates reference sections 65a and 65b to be used in subjecting the noise-generating section 52b to the prediction processing and the section 54b equivalent to the noise-generating section 52b after the prediction processing.

FIG. 12 exemplifies a state that the noise-generating sections 52a and 52b are generated temporally closely as in the cases of FIGS. 8 and 9. In FIG. 12, the sections before and after the noise-generating section 52a (i.e., the first section) are used as the reference sections when processing the noise-generating section 52a. However, in this case, another noise is contained in the reference section temporally after the noise-generating section 52a.

The camera system control unit 25 generates the section 54a for complementing the noise-generating section 52a based on the reference section 63 temporally before the noise-generating section 52a. The processing performed hereinabove is similar to the processing illustrated in FIG. 9.

When processing the audio signal of the noise-generating section 52b (i.e., the second section), since the section 54a has already been subjected to the noise reduction processing, the section 54a is treated as a noise-free section. Therefore, the audio signal processing unit 46 generates an audio signal for complementing the noise-generating section 52b based on the audio signals of the reference sections 65a and 65b.

According to the above-described processing, the audio signal for complementing the audio signals of the noise-generating sections 52a and 52b can be generated without using the audio signal containing noise. As a result, an effect of another noise can be reduced.

Figure 13A:
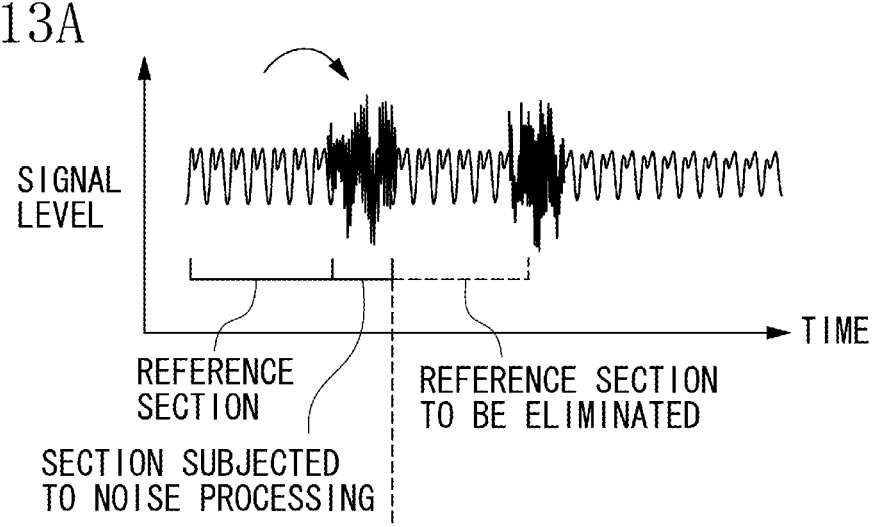
FIGS. 13A, 13B, and 13C each illustrate the prediction processing according to the present exemplary embodiment.
Figure 13B:
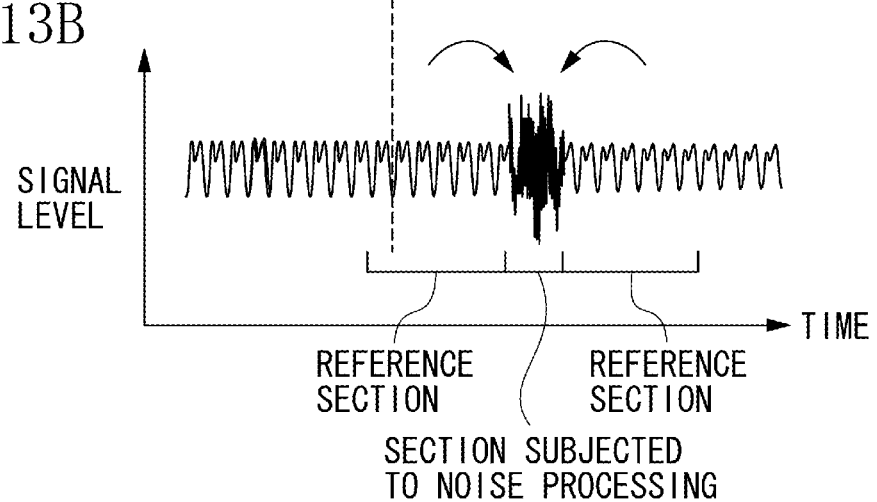
Figure 13C:
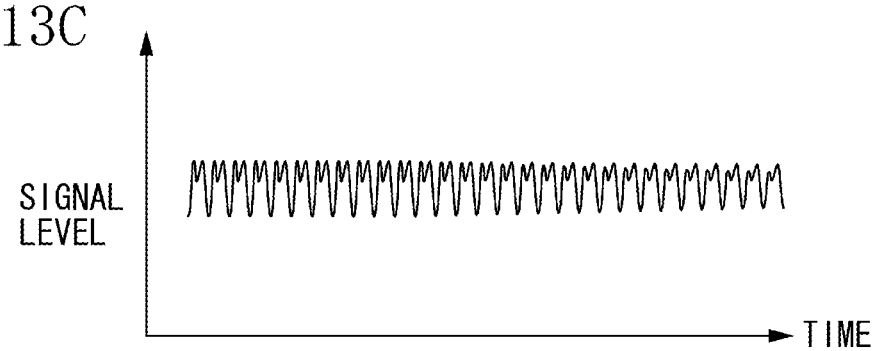

FIGS. 13A, 13B, and 13C each illustrate an example of the waveform of the audio signal performed the processing described above with reference to FIG. 12. FIG. 13A illustrates the waveform before the noise reduction processing. FIG. 13B illustrates the waveform after a noise-generating section temporally before the other noise-generating section is subjected to the noise reduction processing. FIG. 13C illustrates the waveform after a noise-generating section temporally after the other noise-generating section is subjected to the noise reduction processing.

FIG. 13A illustrates a state that a first noise is reduced by an audio signal generated based on the audio signal of the reference section. As it is illustrated in FIG. 12, since the second noise is contained in the reference section for reducing the first noise, the section containing the second noise is not used as the reference section. Instead, the processing is performed based on the audio signal of the reference section before the noise-generating section.

FIG. 13B illustrates a state that the second noise is to be reduced. As illustrated in FIG. 12, the second noise is reduced based on the audio signals of the reference sections before and after the noise-generating section also by using the section having contained the first noise as the reference section between the reference sections for the second noise.

In the processing illustrated in FIGS. 12 and 13A to 13C, in a case where the noise reduction processing of an audio signal containing sequential noise, if the noise of the first noise-generating section is reduced, the signal of the first noise-generating section is complemented with a signal generated based on the audio signal of a predetermined section adjacent to the first noise-generating section. At the time, in a case where another noise is contained in the audio signal of the reference section, the signal of the first noise-generating section is complemented with a signal generated based on the audio signal of the reference section free from another noise. In a case where the noise of the second noise-generating section is reduced, the signal of the second noise-generating section is complemented with a signal generated based on the audio signal of the predetermined section adjacent to the second noise-generating section. At the time, even in a case where a portion of the reference section is superimposed on the first noise-generating section, if the noise reduction processing has carried out on the first noise-generating section, a signal for complementing the signal of the second noise-generating section is generated based on the audio signal of the reference sections.

In other words, by using the audio signal of the first noise-generating section after being complemented, a signal for complementing the audio signal of the second noise-generating section is generated.

Figure 14:
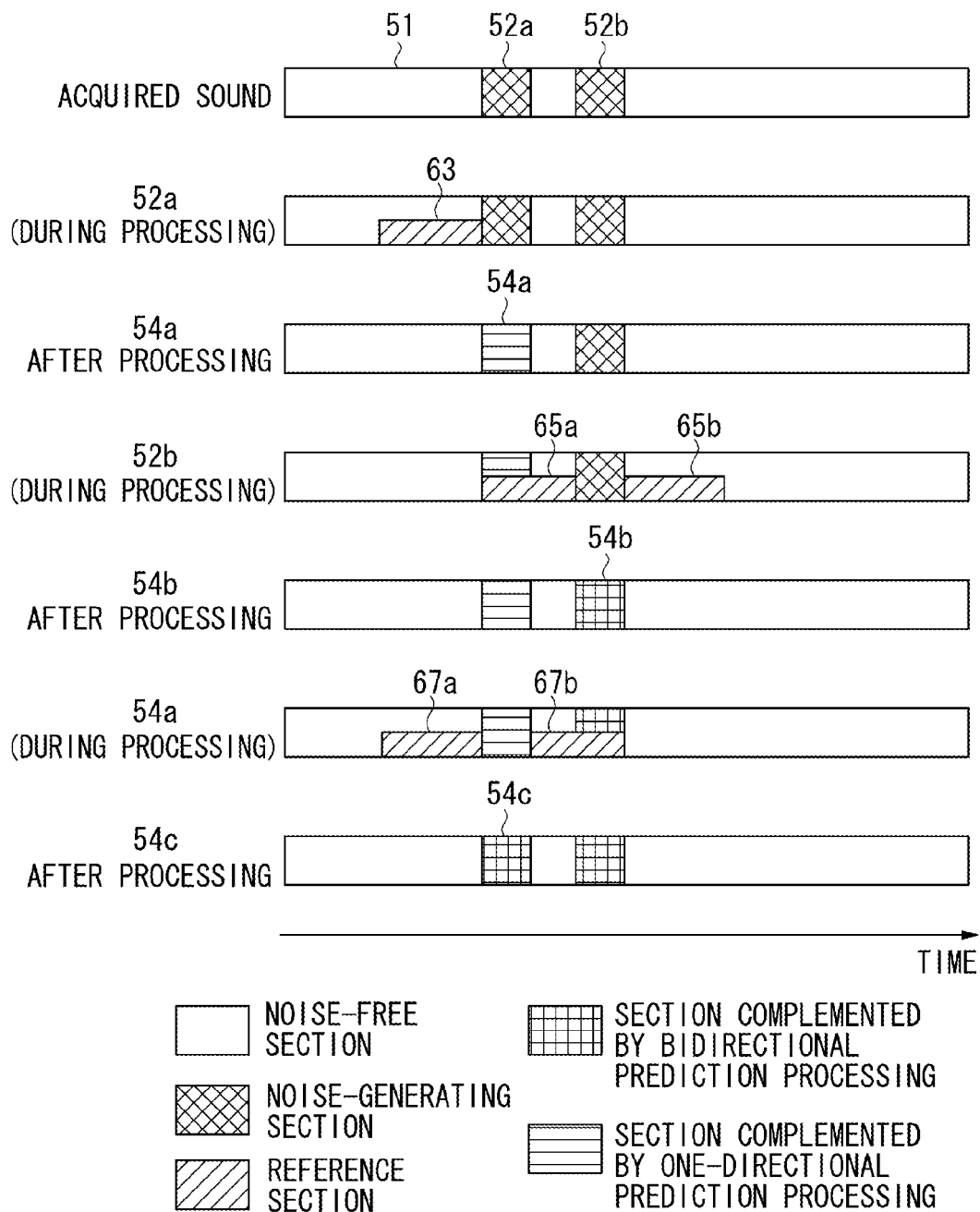
FIG. 14 illustrates the prediction processing according to the present exemplary embodiment.

The other noise reduction processing is described below. FIGS. 14 and 15 illustrate the other noise reduction processing. FIG. 14 illustrates the noise-free section 51 and the noise-generating sections 52a and 52b. FIG. 14 further illustrates the reference section 63 to be used in subjecting the noise-generating section 52a to the prediction processing and the section 54a equivalent to the section 52a after being complemented by the prediction processing. FIG. 14 further illustrates the reference sections 65a and 65b to be used in subjecting the noise-generating section 52b to the prediction processing. FIG. 14 further illustrates the section 54b equivalent to the noise-generating section 52b after being complemented by the prediction processing. FIG. 14 further illustrates reference sections 67a and 67b to be used in subjecting the section 54a to the prediction processing. FIG. 14 still further illustrates a section 54c equivalent to the section 54a after being complemented by the prediction processing.

FIG. 14 exemplifies a state in which the noise-generating section 52a and 52b are generated temporally close to each other as the cases of FIGS. 8, 9, and 12. In FIG. 14, when the noise-generating section 52a is subjected to the noise reduction processing, the sections before and after the noise-generating section 52a are used as the reference sections. In this case, the reference section temporally after the noise-generating section 52a contains another noise.

Accordingly, the camera system control unit 25 generates the section 54a for complementing the noise-generating section 52a based on the reference section 63 temporally before the noise-generating section 52a. The processing described hereinabove is similar to the processing illustrated in FIG. 9.

When subjecting the audio signal of the noise-generating section 52b to the noise reduction processing, since the section 54a has already been subjected to the noise reduction processing, the section 54a is treated as the noise-free section. Therefore, the audio signal processing unit 46 generates an audio signal for complementing the noise-generating section 52b based on the audio signals of the reference sections 65a and 65b. The processing described hereinabove is similar to the processing illustrated in FIG. 12.

In FIG. 14, the processing for further complementing the audio signal of the section having been complemented by the section 54a is performed. In other words, the signal in the section 54a is generated based on the audio signal of the reference section temporally before the noise-generating section 52a, and is generated without using the audio signal of the reference section after the noise-generating section 52a. Therefore, the complementary signal in the section 54c is to be generated again based on the audio signal of the reference section 67b containing the audio signal after the complement to the noise-generating section 52b after the section 54a and an audio signal of a reference section 67a before the section 54a.

According to the above-described processing, sound quality of the audio signal after the noise reduction may be improved. Even in a case where a plurality of noises is sequentially generated, the noise reduction may be effectively carried out.

The prediction processing may be repeated until a difference between the signals becomes small. In an example of FIG. 14, if a difference between the signals in the sections 54a and 54c is small enough, the signals are employed. In a case where the difference is large, the signal in the section 54c is used to process the section 54b again and, thereafter, the signal 54c is processed.

Figure 15A:
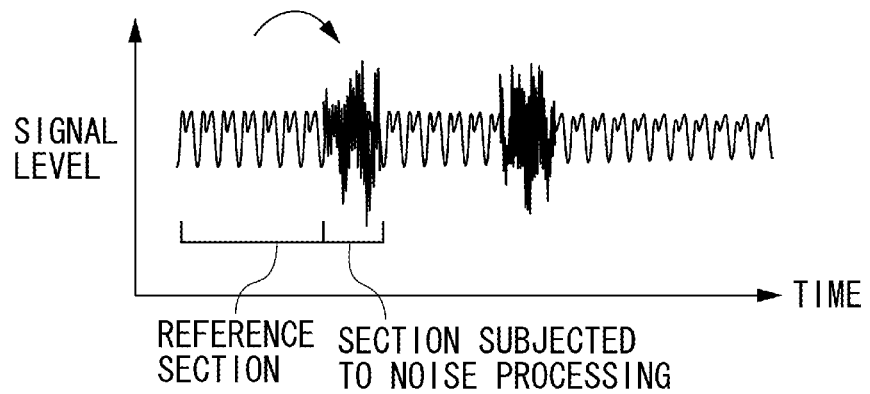
FIGS. 15A, 15B, 15C, and 15D each illustrate the prediction processing according to the present exemplary embodiment.
Figure 15B:
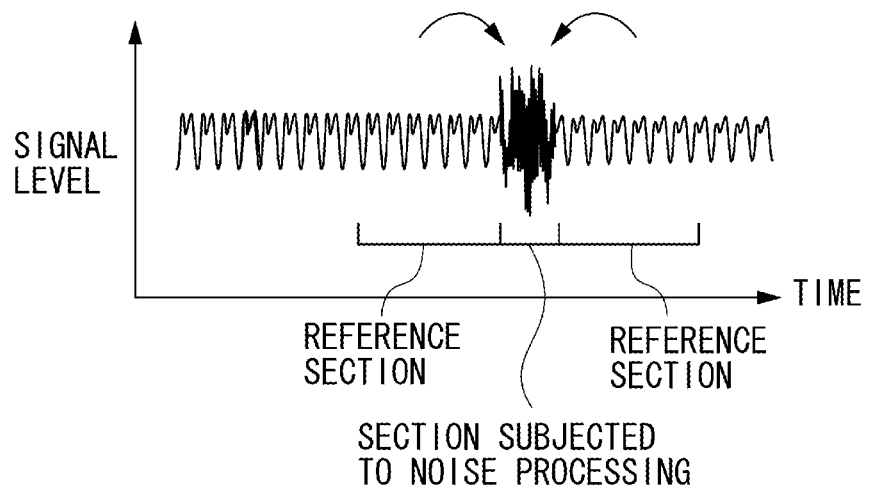
Figure 15C:
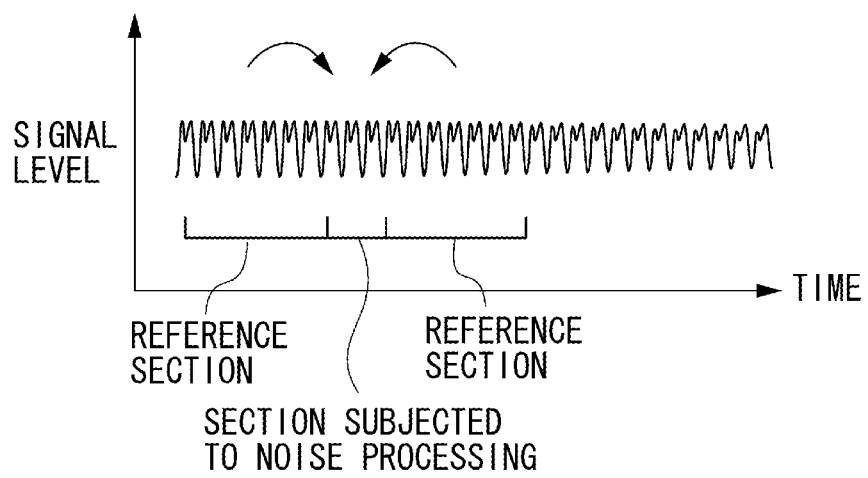
Figure 15D:
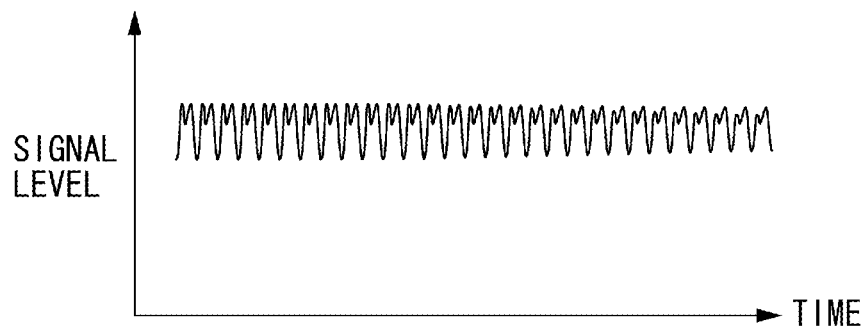

FIGS. 15A, 15B, 15C, and 15D each illustrate an example of the processed waveform of the sound signal illustrated in FIG. 14. FIG. 15A illustrates the waveform before the noise reduction processing. FIG. 15B illustrates the waveform after the noise-generating section temporally before the other noise-generating section is subjected to the noise reduction processing. FIG. 15C illustrates the waveform after the noise-generating section temporally after the other noise-generating section is subjected to the noise reduction processing. FIG. 15D illustrates the waveform after the noise-generating section temporally before the other noise-generating section is subjected to the noise reduction processing again.

FIG. 15A illustrates a state that the first noise is reduced by the audio signal generated based on the audio signal of the reference section. As illustrated in FIG. 14, since the second noise is contained in the reference section to be used in reducing the first noise, the processing is to be performed based on the audio signal of the reference section before the noise-generating section without using the section containing the second noise as the reference section.

FIG. 15B illustrates a state that the second noise is to be reduced. As illustrated in FIG. 14, the second noise is reduced based on the audio signals of the reference sections before and after the noise-generating section, wherein the reference section, between the reference sections for the second noise, having contained the first noise is also treated as the reference section.

FIG. 15C illustrates a state that the audio signal of the section at which the first noise has been generated is to be complemented with the signal generated based on the audio signals of the reference sections before and after the section at which the first noise has been generated.

The present exemplary embodiment is described above with an example of the imaging apparatus. However, any apparatus may be employed as far as the apparatus can process the audio signal. For example, any apparatus capable of treating sound, e.g., a computer, a mobile phone, and a game machine, can be employed. A program capable of causing a computer to execute the above-described processing is also encompassed within the concept of the present invention.

The above-described exemplary embodiment also can be realized by a system or a computer (or a CPU or a micro processing unit (MPU)) of an apparatus using software. Therefore, to realize the above-described exemplary embodiment by using a computer, a computer program itself to be supplied to the computer also realizes the exemplary embodiment of the present invention. In other words, the computer program itself for realizing the above-described function of the present exemplary embodiment is also included in the exemplary embodiment of the present invention.

A computer program for realizing the above-described function of the present exemplary embodiment may have any configuration as far as the computer program can be read by a computer. For example, the computer program may include, but not limited to, object code, a program executable by an interpreter, and script data to be supplied to an operating system (OS). The computer program for realizing the above-described function of the present exemplary embodiment is supplied to the computer via a storage medium or a wired/wireless communication. Examples of the storage medium for supplying the program include a flexible disk, a hard disk, a magnetic storage medium, such as a magnetic tape, a optical/magneto-optical storage medium such as a magneto-optical disk (MO), a compact disc (CD), and a digital versatile disk (DVD), and a nonvolatile semiconductor memory.

An example of the method for supplying the computer program by using the wired/wireless communication includes a method in which a server on a computer network is used. In this case, a data file (i.e., a program file), which can be a computer program included in the exemplary embodiment of the present invention, is stored in the server. The program file may be an executable program file or a source code. The program file is downloaded to a client computer accessed to the server. In this case, the program file may be divided into a plurality of segment files and each segment file may be downloaded to different servers. In other words, a server apparatus for providing the program file for realizing the functions of the above-described exemplary embodiment to the client computer is also included to the exemplary embodiment of the present invention.

Such a configuration may also be employable that the computer program for realizing the above-described functions of the present exemplary embodiment is encoded to be stored in a storage medium and the storage medium may be delivered to the users, and thereafter the users satisfying predetermined conditions are supplied with key information for breaking a code thereof to allow the program to be installed into a computer of the user. The key information may be supplied, for example, by downloading the key information from a home page via an internet. Also, the computer program for realizing the above-described functions of the present exemplary embodiment may use a function of the OS operating on the computer. The computer program for realizing the above-described functions of the present exemplary embodiment may include firmware, such as an expansion board, to be partially mounted on the computer or may be executed by a central processing unit (CPU) mounted the expansion board.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-046791 filed Mar. 2, 2012, which is hereby incorporated by reference herein in its entirety.

What is claimed is:

1. An audio processing apparatus comprising:
   an acquisition unit configured to acquire an audio signal; and
   an audio processing unit configured to reduce noise in the audio signal,
   wherein the audio processing unit is further configured to generate a complement signal using at least one of an audio signal in a first predetermined section before a first noise section including noise in the audio signal acquired by the acquisition unit and an audio signal in a second predetermined section after the first noise section and complements an audio signal of the first noise section with the complement signal such that noise in the audio signal acquired by the acquisition unit is reduced, and
   wherein the audio processing unit is further configured to generate the complement signal using the audio signal in the second predetermined section if noise is included in the first predetermined section and noise is not included in the second predetermined section, and
   to generate the complement signal using the audio signal in the first predetermined section if noise is included in the second predetermined section and noise is not included in the first predetermined section.

2. The audio processing apparatus according to claim 1, wherein, in a case where a second noise section including noise is included in the second predetermined section and is not included in a third predetermined section, after the second noise section the audio processing unit is further configured to generate a second complement signal for the second noise section using an audio signal of the third predetermined section and to complement the audio signal in the second noise section with the second complement signal.

3. The audio processing apparatus according to claim 1, further comprising:
   a determination unit configured to determine a noise section including noise in the audio signal acquired by the acquisition unit.

4. The audio processing apparatus according to claim 1, further comprising:
   an optical unit configured to acquire an optical image of an object to input the optical image into an imaging unit; and
   a control unit configured to control driving of the optical unit,
   wherein the audio processing unit specifies a noise section including noise based on an instruction to drive the optical unit by the control unit.

5. The audio processing apparatus according to claim 1, wherein the audio processing unit generates the complement signal by using the audio signal in the second predetermined section and without using the audio signal in the first predetermined section if noise is included in the first predetermined section and noise is not included in the second predetermined section, and generates the complement signal by using the audio signal in the first predetermined section and without using the audio signal in the second predetermined section if noise is included in the second predetermined section and noise is not included in the first predetermined section.

6. The audio processing apparatus according to claim 1, wherein the audio processing unit generates the complement signal using both the audio signal in the first predetermined section and the audio signal in the second predetermined section if noise is not included in any of the first predetermined section and the second predetermined section.

7. An audio processing method comprising:
   acquiring an audio signal;
   generating a complement signal using at least one of an audio signal in a first predetermined section before a first noise section including noise in the acquired audio signal and an audio signal in a second predetermined section after the first noise section;
   wherein generating step generates the complement signal using the audio signal in the second predetermined section if noise is included in the first predetermined section and noise is not in the second predetermined section, and generate the complement signal using the audio signal in the first predetermined section if noise is included in the second predetermined section and noise is not included in the first predetermined section; and
   complementing the audio signal in the first noise section with the complement signal such that noise in the acquired audio signal is reduced.

8. The audio processing method according to claim 7, wherein if a second noise section including noise is included in the second predetermined section and noise is not included in a third predetermined section after the second noise section, the generating generates a second complement signal for the second noise section using an audio signal in the third predetermined section, and the complementing complements the audio signal in the second noise section with the second complement signal.

9. An audio processing apparatus comprising:
   an acquisition unit configured to acquire an audio signal; and
   an audio processing unit configured to perform a process for reducing noise in the audio signal acquired by the acquisition unit,
   wherein the audio processing unit processes an audio signal in a noise section including noise by using a prediction signal generated based on at least one of an audio signal in a reference section before the noise section and an audio signal in reference section after the noise section, and
   wherein, in a case where a time difference between a first noise and a second noise is within a range of a predetermined time, wherein the second noise is generated after the first noise, the audio processing unit processes an audio signal in a first noise section containing the first noise by using a prediction signal generated based on the audio signal in a reference section before the first noise section, and
   the audio processing unit processes an audio signal in a second noise section containing the second noise by using a prediction signal generated based on the audio signal in a reference section after the second noise section.

10. The audio processing apparatus according to claim 9, wherein the audio processing unit complements the audio signal in the first noise section with the first prediction signal and complements the audio signal in the second noise section with the second prediction signal.

11. The audio processing apparatus according to claim 9, wherein if the time difference between the first noise and the second noise is within the range of a predetermined time, the audio processing unit generates the first prediction signal using the audio signal in a reference section before the first noise section and without using the audio signal in a reference section after the first noise section, and generates the second prediction signal using the audio signal in a reference section after the second noise section and without using the audio signal in a reference section before the second noise section.

12. The audio processing apparatus according to claim 9, wherein the predetermined time relates to a time length of the reference section.

13. An audio processing apparatus comprising:
- an acquisition unit configured to acquire an audio signal; and
- an audio processing unit configured to process the audio signal acquired by the acquisition unit,
- wherein the audio processing unit processes an audio signal in a section containing noise by using a prediction signal generated based on an audio signal in a reference section before the section containing noise and/or an audio signal in reference section after the section containing noise, and
- wherein, in a case where a time difference between a first noise and a second noise is within a range of a predetermined time, wherein the second noise is generated after the first noise, the audio processing unit processes an audio signal in a section containing the first noise by using a first prediction signal generated based on an audio signal in a reference section before the section containing the first noise, and
- the audio processing unit processes an audio signal in a section containing the second noise by using a second prediction signal, wherein the second prediction signal is generated based on an audio signal in a reference section after the section containing the second noise and the audio signal in a reference section before the section containing the second noise containing the first prediction signal.

* * * * *